US007752744B2

(12) United States Patent
Foster et al.

(10) Patent No.: US 7,752,744 B2

(45) Date of Patent: Jul. 13, 2010

(54) CABLE SHIELDING FLARING TOOL

(75) Inventors: Monty Jake Foster, Colorado Springs, CO (US); Joe Capobianco, Colorado Springs, CO (US)

(73) Assignee: ITT Manufacturing Enterprises, Incorporated, Wilmington, DE (US)

( * ) Notice: Subject to any disclaimer, the term of this patent is extended or adjusted under 35 U.S.C. 154(b) by 283 days.

(21) Appl. No.: 10/270,482

(22) Filed: Oct. 16, 2002

(65) Prior Publication Data

US 2004/0074087 A1 Apr. 22, 2004

(51) Int. Cl.
*B23P 19/00* (2006.01)

(52) U.S. Cl. .......................... 29/758; 29/33 F; 29/278; 29/828; 29/857; 72/409.13

(58) Field of Classification Search .................. 29/278, 29/33 F, 758, 857, 828; 72/409.1, 409.13, 72/409.19

See application file for complete search history.

(56) References Cited

U.S. PATENT DOCUMENTS

| | | | | |
|---|---|---|---|---|
| 3,725,991 | A * | 4/1973 | Lynch | 29/764 |
| 5,521,331 | A * | 5/1996 | Hillburn | 174/36 |
| 5,743,131 | A * | 4/1998 | Holliday et al. | 72/409.1 |
| 6,347,450 | B1 * | 2/2002 | Langlois et al. | 29/748 |

OTHER PUBLICATIONS

US 6,347,450 (Sheet 1 of 2).*

* cited by examiner

*Primary Examiner*—Rick K Chang
(74) *Attorney, Agent, or Firm*—Baker & Hostetler LLP

(57) ABSTRACT

A flairing device having a handle and a body connected to the handle. The body includes an inner wall forming an open ended chamber in the body. The open ended chamber has an opening at one end of the body. An outer wall forms an edge with the inner wall at the one end of the body.

8 Claims, 8 Drawing Sheets

800

CABLE SHIELDING FLARING TOOL

GOVERNMENT RIGHTS IN THIS INVENTION

This invention was made with U.S. government support under contract number 8942184. The U.S. government has certain rights in this invention.

PRIORITY

This application claims priority to U.S. Patent Application entitled, Automated Connection of Connectors to Cables, filed Jul. 26, 2002, having Ser. No. 10/202,893, and Positioning a Connector for Crimping a Ferrule Onto a Cable, filed Jul. 26, 2002, having Ser. No. 10/202,894 the disclosures of which are incorporated herein by reference.

FIELD OF THE INVENTION

The present invention relates generally to separating layers of a cable. More particularly, the present invention relates to separating shielding from a dielectric core of a coaxial cable.

BACKGROUND OF THE INVENTION

Connectors are typically manually connected to cables, such as coaxial cables or RF cables. This involves repetitive motion by a worker by first stripping the cable and placing a ferrule over the stripped end of the cable. A connector is then placed onto the cable and the ferrule pushed up over top of the cable into or onto the connector. The ferrule can then be crimped to secure the ferrule onto the cable.

There are many deficiencies to manually installing connectors onto a cable such as a coaxial cable or RF cable. One major deficiency is repetitive motion by a worker which may cause fatigue and result in improperly connected connectors. For example, most cables have a metal braid within the outer sheath of the cable. When manually placing the connector onto the cable, this braid can many times be damaged or pushed back too far. This will result in improper shielding and could cause negative effects especially when using high frequency cables.

Another deficiency is not achieving proper contact depth. When attaching a connector to a cable the conductor or center part of the cable must be properly positioned on the center part or contact portion of the connector. When the conductor is properly positioned or seated onto the connector at the proper depth, proper contact depth has been achieved. Improper contact depth is caused through manual installation of connectors onto cables. Although some connectors include features that will indicate when proper contact depth is achieved, these features are usually inadequate and do not work well. Also the use of these features can be time consuming.

When creating cables such as coaxial cables with connectors, it is important to keep the cables uniform so that uniform results can be obtained. However, during manual installation and because of fatigue which may be introduced through manual installation, the cables may not be uniformly manufactured. Thus, the installation could also become very time consuming. Accordingly, a way to install connectors and to crimp ferrules onto the cable that will provide uniform consistent results giving proper contact depth and efficient processing time is desired.

SUMMARY OF THE INVENTION

The present invention includes an apparatus for effectively separating the shielding of a coaxial cable from the cable so that a connector can be easily connected to the end of the cable. One embodiment of the invention includes a flairing device having a handle and a body connected to the handle. The body includes an inner wall forming an open ended chamber in the body. The open ended chamber has an opening at one end of the body. An outer wall forms an edge with the inner wall at the one end of the body.

In another embodiment of the invention, a method for separating an outer member of an object from an inner member of the object includes the steps of placing an end of a flair device onto the object so that a chamber formed by an inner wall of the flair device having an opening at the end of the flair device that can be pushed onto the inner member of the object, and pushing the end of the flair device into the object so that an edge at the end of the flair device separates the inner member from the outer member allowing the inner member to enter the chamber.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

The present invention provides a way of connecting a connector onto a cable at a proper contact depth without gauging and properly and uniformly crimping a ferrule onto a cable without damaging the center contact or shielding. The present invention also provides a way of positioning the shielding of the cable over the connector body without disturbing the shielding of the cable. The present invention further provides a way of connecting a connector onto a cable precisely and efficiently.

Figure 1A:
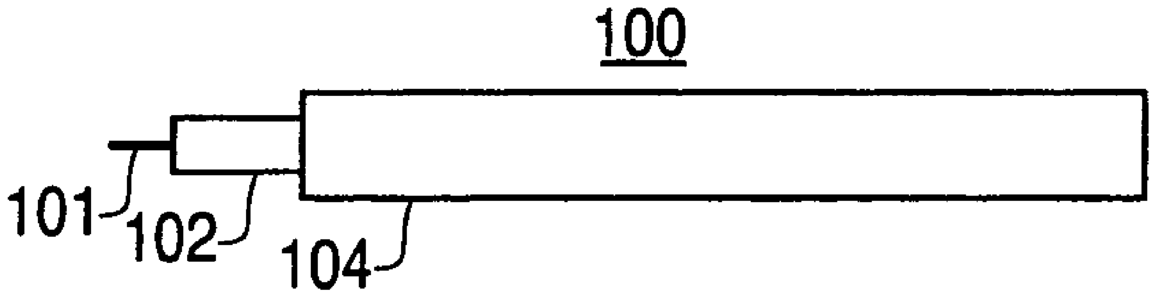
FIG. 1A is an illustration of a stripped cable.
Figure 1B:
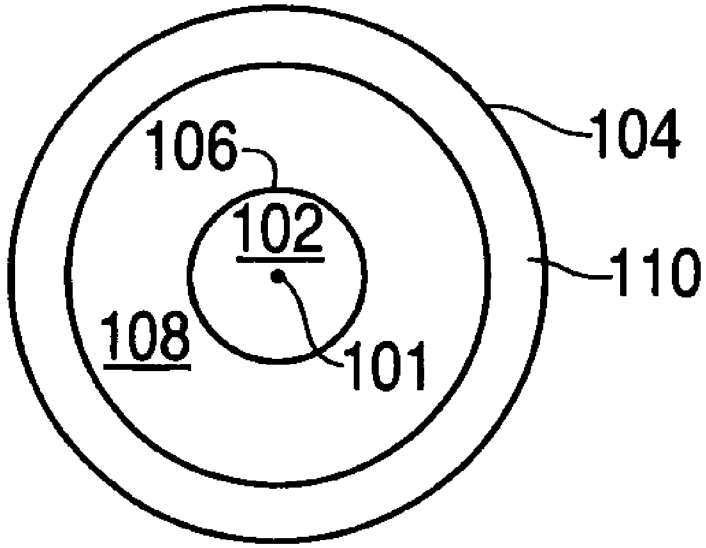
FIG. 1B is a front view of the stripped cable illustrated in FIG. 1A.

FIG. 1A is an illustration of a coaxial cable 100 having a core 101, a place covering or dielectric 102 and an outer jacket 104. FIG. 1B is a front view of the coaxial cable 100 depicted in FIG. 1A. The coaxial cable depicted in FIG. 1B has a core 101 and a dielectric 102 surrounding core 101. An inner flat braid 106 surrounds the dielectric 102. A center foil 108 surrounds inner flat braid 106 and an outer braid 110 surrounds center foil 108. Outer braid 110 is surround by outer jacket 104.

Figure 2A:
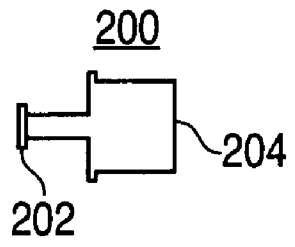
FIG. 2A is an illustration of a connector.
Figure 2B:
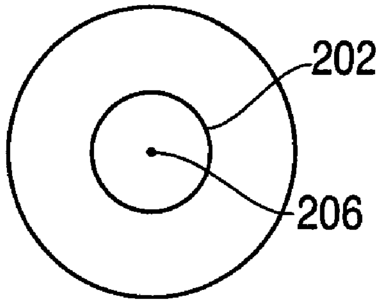
FIG. 2B is a front view of the connector illustrated in FIG. 2A.

FIG. 2A is an illustration of a connector 200 having a first end 202 and a second end 204. FIG. 2B is a front view of the first end 202 of connector 200 having a contact 206. When manually connecting connector 200 to a coaxial cable 100, the coaxial cable 100 must be stripped to expose core 101. As depicted in FIG. 1A, core 101 can be exposed by cutting away dielectric 102, outer jacket 104 and all other layers located therebetween. Connector 200 is connected to the coaxial cable via end 204. This may involve separating the braiding such as the outer braid 110, the foil or wrap mylar film 108 and the inner braid 106 away from dielectric 102. This can be accomplished by working connector end 204 slowly onto the coaxial cable to ensure that these layers are pushed back properly.

Figure 3:
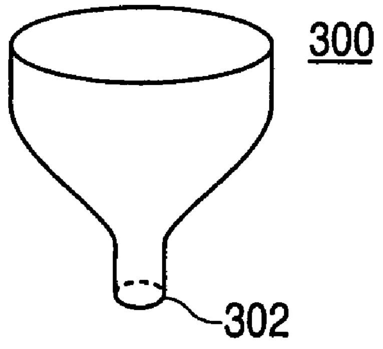
FIG. 3 is an illustration of a flair device.

In one embodiment of the invention, a flair device 300 can be used as depicted in FIG. 3. Flair device 300 has an opening 302, which is of a sufficient width to separate the braiding such as the outer braid 110, the foil or wrap mylar film 108 and the inner braid 106 away from dielectric 102. Once cable 100 is stripped, opening 302 is pushed onto the stripped end of cable 100. Since opening 302 is of a sufficient width to separate dielectric 102 from the outer layer such as the outer braid 110, the foil or wrap mylar film 108 and the inner braid 106, the outer layers are separated from dielectric 102 without causing any damage to any of the outer layers. By using flair device 300 the problem of damaging the shielding wall when sliding the connector onto the coaxial cable is obviated.

Once the outer layers have been pushed back sufficiently, second end 203 of connector 200 is pushed onto the stripped end of cable 100 until core 101 connects with contact 206 at a sufficient contact depth. In some instances good contact may not be made because a good contact between core 101 and contact 206 is not made. This can, in some instances, be overcome by including features such as small inspection holes in contact 206 to determine whether proper contact has been made or providing a means on contact 206 in which a audible click can be heard when the center pin or core 101 is properly seated onto the connector. However, in some instances, this can be time consuming. Furthermore, once the connector is properly placed onto the coaxial cable the ferrule must be slid onto to coaxial cable up against the connector 102. Once the braiding has been expanded and the connector is pushed onto the cable it can be very difficult to jam the ferrule up against connector 200 without damaging the braiding.

Figure 4:
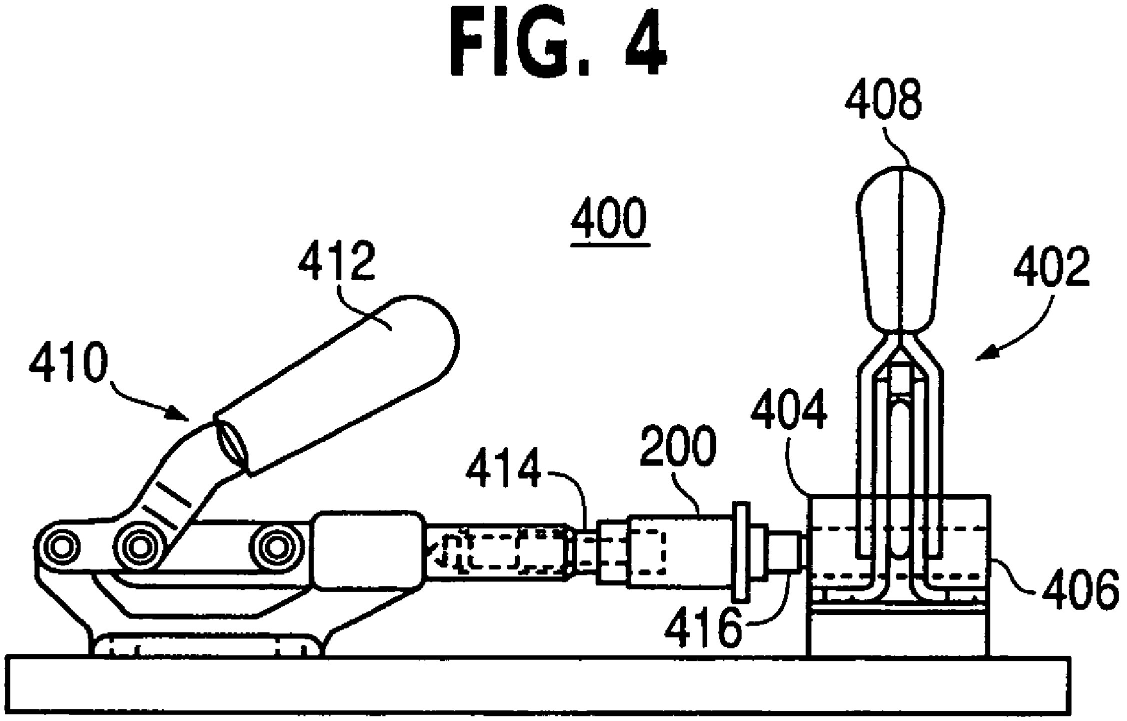
FIG. 4 is an illustration of a connection device.

FIG. 4 is an illustration of a connection device 400 for accurately connecting a connector onto a cable. FIG. 4 includes a securing device 402 and a stop 404, which is attached to securing device 402. Stop 404 can be integrally attached to securing device 402. Securing device 402 also includes a passage 406 for receiving a cable such as a coaxial cable and a handle 408 which when engaged secures a cable in passage 406. In one embodiment of the invention handle 408 can be locked in the engaged position allowing for one hand operation.

A connector installer 410 is spaced from securing device 402. The connector installer 410 includes a handle 412 and a connector engagement device 414. Handle 412 like handle 408 can be locked in an engaged position allowing for one hand operation. When handle 412 is engaged, the engagement device 414 will operate to force fit connector 200 onto a cable pushing a ferrule 416 against the stop 404 and simultaneously against connector 200. In one embodiment of the invention, connector engagement device 414 moves to the right to push or force fit the connector 200 onto cable 100. In another embodiment of the invention, the connector 200 is attached to the engagement device 414. As engagement device 414 moves to the right, the connector 200 is pushed or force fit onto the cable 100.

Figure 5:
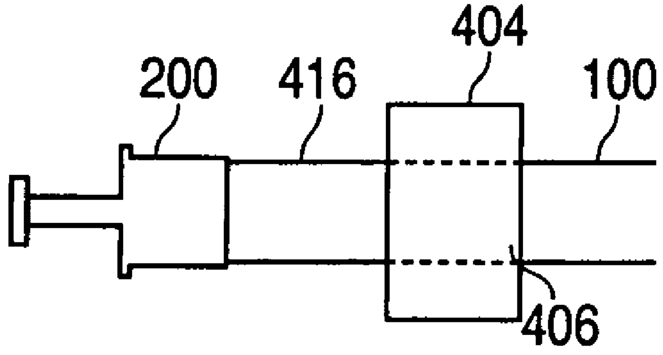
FIG. 5 is an illustration showing a ferrule being pushed up against a stop by a connector.

FIG. 5 is an illustration of the connector forced fitted onto the cable 100 having a ferrule 416 pushed up against stop 404. As is illustrated in FIG. 5, the apparatus as illustrated in FIG. 4 provides an efficient way to connect connector 200 to cable 100 and at the same time move ferrule 416 into the appropriate position using stop 404. This provides a quick efficient way of uniformly attaching multiple connectors to a cable with less repetitive motion stress and also avoiding damaging the braiding. This also provides a way of getting the core 101 to be seated properly onto contact 206 of connector 200 and also ensures that the assembly of the connector is tight and prevents the connector from spinning or twisting on the cable (loose connectors cause cable failures, especially at high frequencies).

Figure 6:
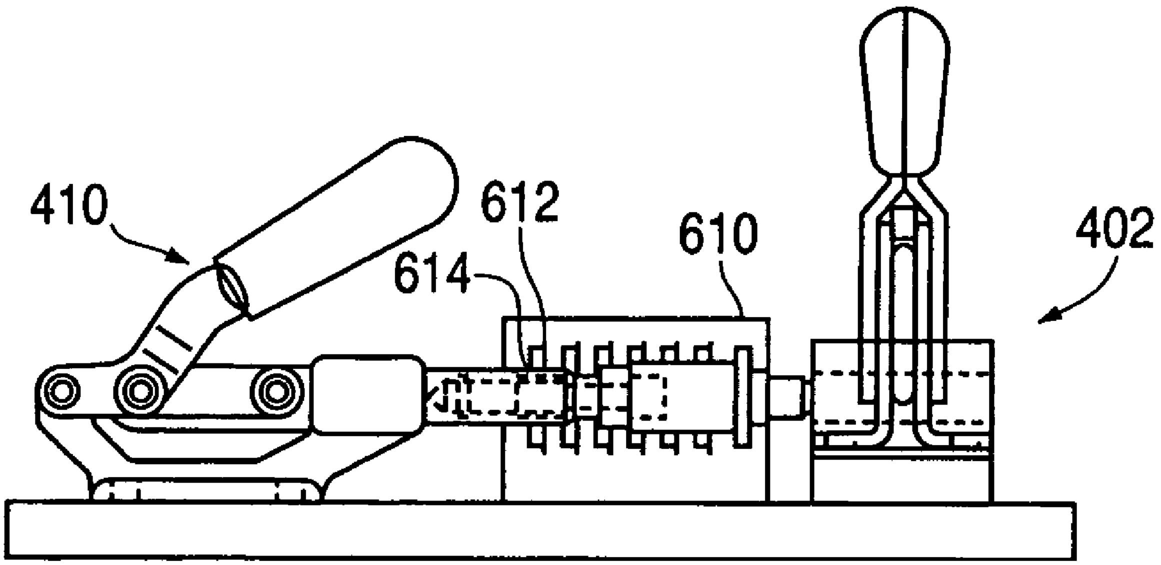
FIG. 6 is an illustration of a connection device with a indicator attachment.

As illustrated in FIG. 6, the connection device 400 can also include an indicator 610 which will help determine the appropriate length of the cable to obtain uniform results and ensure proper seating of core 101 onto contact 206 of connector 200. The cable 100 can be placed in passage 406 of securing device 402. Using markings 612 located on indicator 610, the cable 100 can be placed in the passage 406 of securing device 402 until the end of cable 100 reaches the appropriate marking 612. Thus, the correct contact depth will be achieved easily and uniformly. Markings 612 can also have retractable extensions 614 that extend outwards so that the cable 100 can be accurately measured. Once the cable 100 is measured, the retractable extensions 614 can be retracted so that connector 200 can be connected to the cable. Once the connector 200 is appropriately connected to the cable 100, the handles 408 and 412 can be released to disengage the cable 100 and connector 200.

Figure 7:
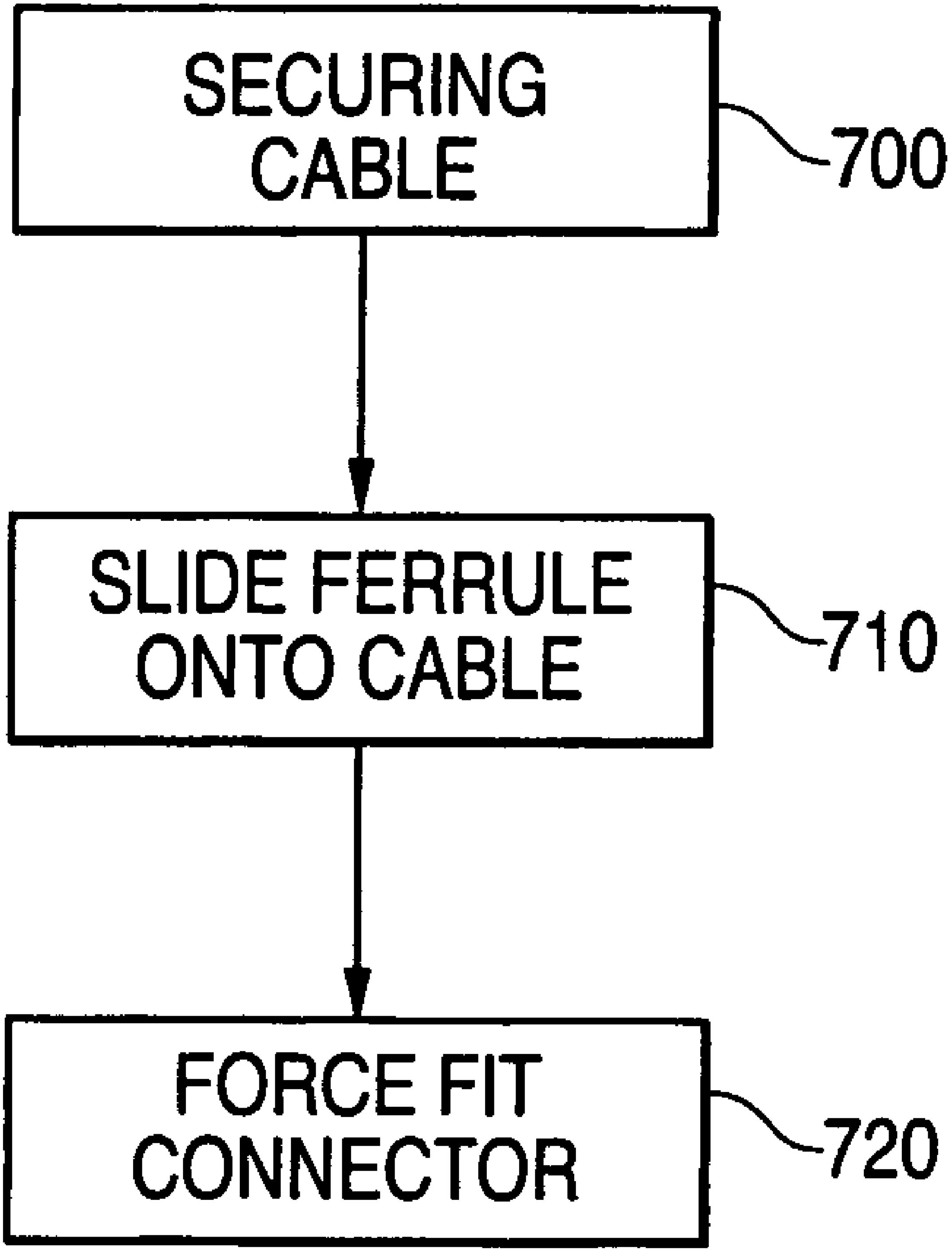
FIG. 7 is an illustration of method steps for connecting a connector to a cable.

FIG. 7 is an illustration of the method steps used to connect the connector 200 to cable 100. In step 700 the cable is secured using securing device 402. In one embodiment of the invention the cable is secured by being placed in passage 406. The cable can then be aligned to alignment member 610 to determine the proper length of the cable. Measuring the proper cable length will ensure that core 101 is properly seated onto connector 200. When the proper length of the cable has been measured, securing handle 408 can be engaged to secure the cable 100. A ferrule is then slid onto the end of the cable where connector 200 is to be connected. Connector 200 can then be placed on the cable 100 or the connector engagement device 414. Once handle 412 is pressed down the engagement device moves toward the cable 100 so that connector 200 is force fitted onto the cable as illustrated in step 720. Once the engagement device 414 engages the connector 200 and force fits connector 200 onto the cable, the ferrule 416 is pushed against the stop 404 thereby properly engaging ferrule 416 to the connector 100 such that the braiding is not damaged. The braiding bunches up underneath ferrule 416 to make a tight connection.

Figure 8A:
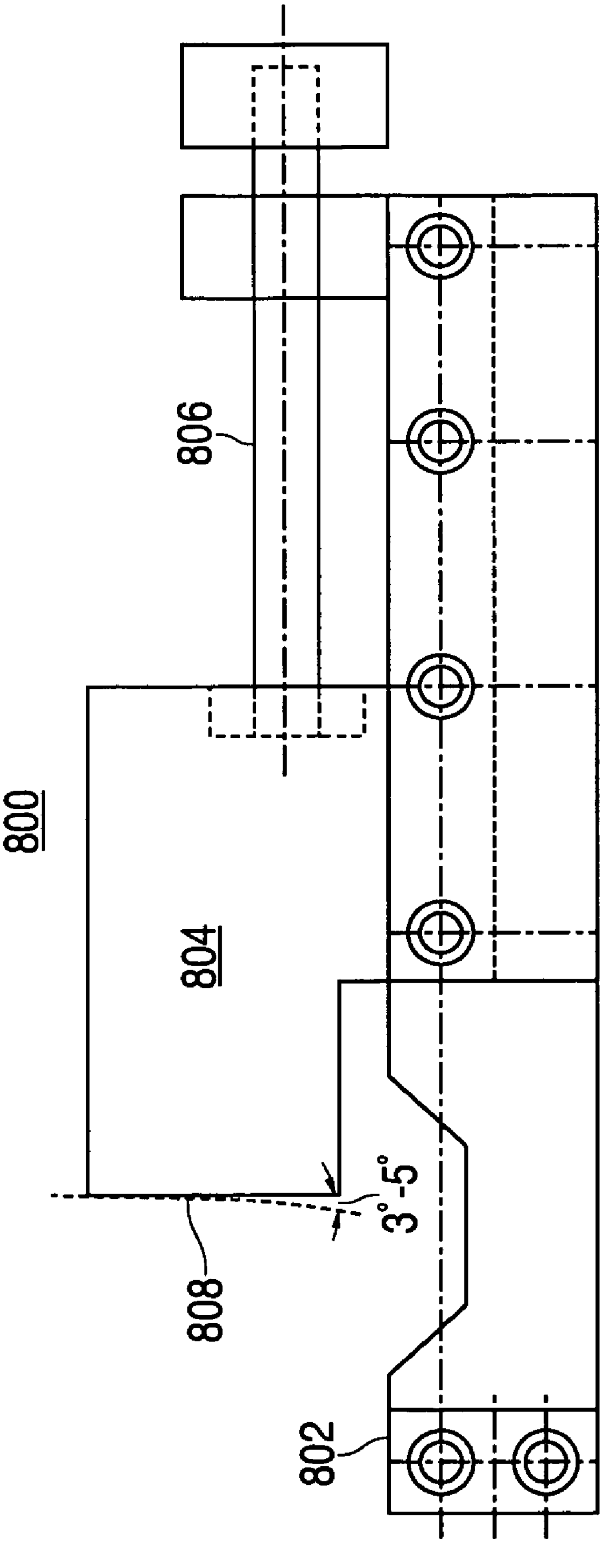
FIG. 8A is a side view of a connector positioner.
Figure 8B:
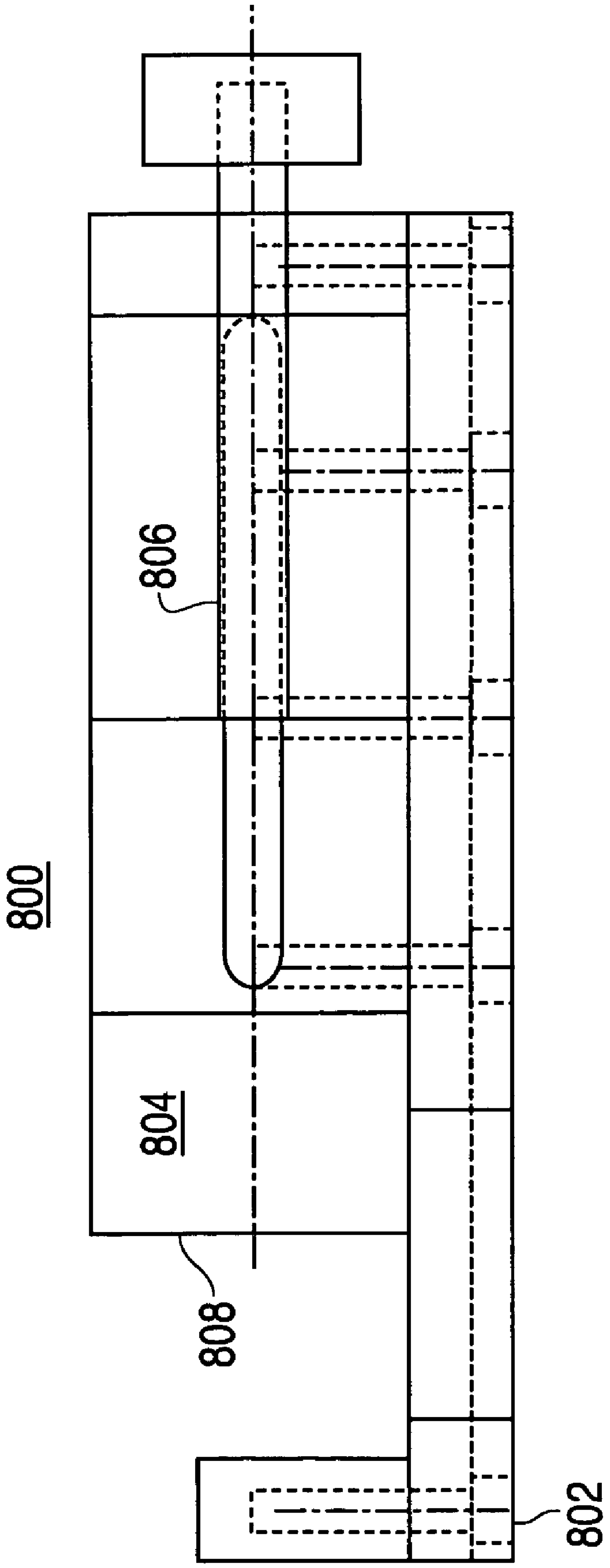
FIG. 8B is a top view of a connector positioner.

Once the connector 200 and ferrule 416 are in proper position, the ferrule 416 can be crimped to the cable 100. FIG. 8A is a side view of a connector positioner 800 having a base 802 and a cable stop 804. An adjustment member 806 is attached to cable stop 804. Adjustment member 806 moves cable stop 804 so that when the connector 200 of cable 100 rests against outer surface 808 of cable stop 804, ferrule 416 of cable 100 is properly positioned to be crimped. Base 802 can include a depression 810 to accommodate the size of a connector at the end of a cable. FIG. 7B is a top view of connector positioner 800.

Figure 9:
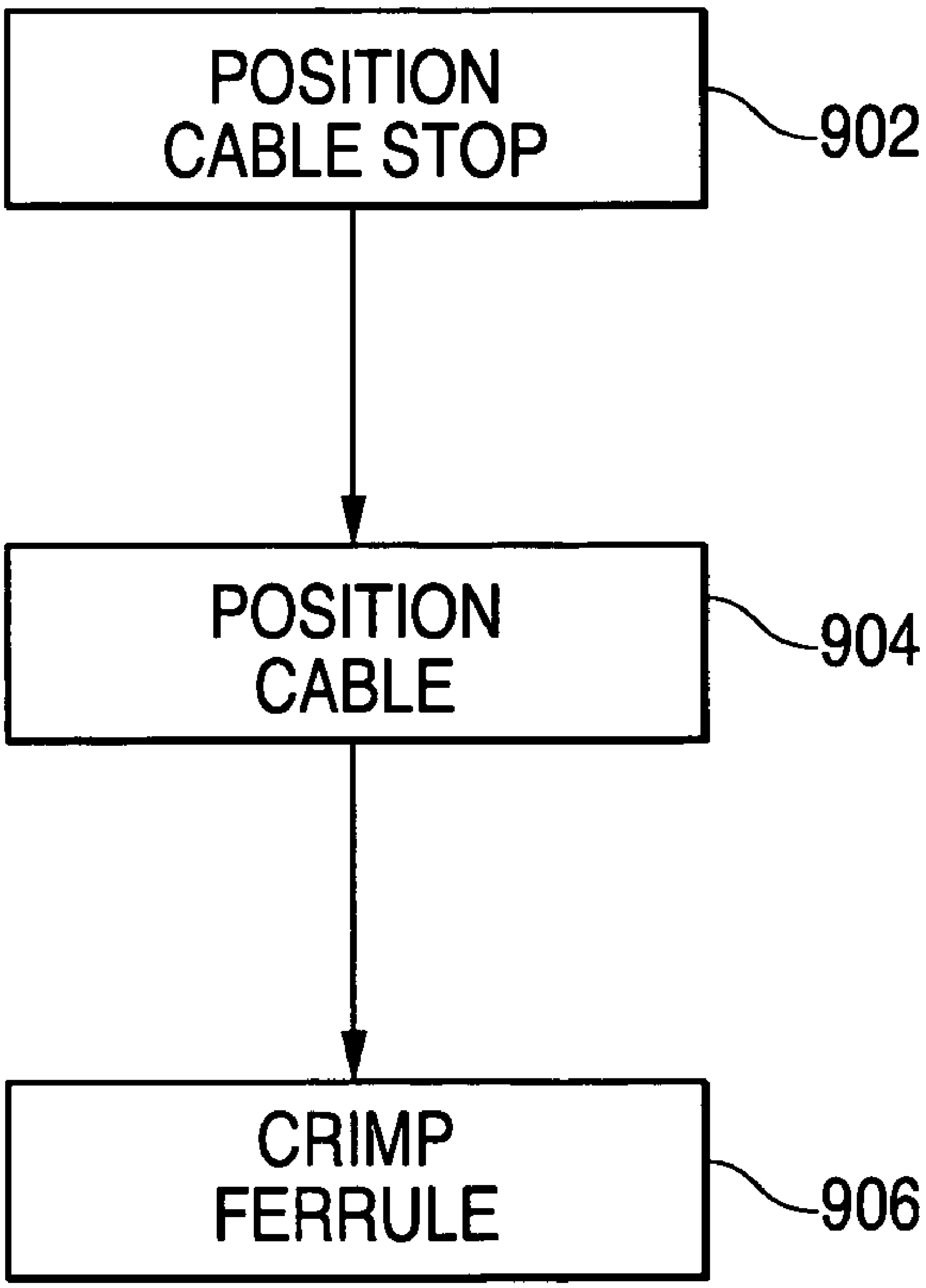
FIG. 9 is a flow chart showing the steps taken in crimping a ferrule.

The connector positioner 800 can be used to properly position cable 100, connector 200 and ferrule 416 to be crimped. As illustrated in FIG. 9, in step 902 the cable stop 804 is positioned using adjustment member 806. Cable stop 804 can be positioned so that the ferrule 416 lies on the base 802 and the connector 200 is in the center of depression 810. Depression 810 can have a depth that will accommodate connector 200 without miss-aligning the connector 200 with cable 100.

In step 904 the connector 200 of cable 100 is placed against outer surface 808 of cable stop 804. Once the cable 100 is in place, a clamp can be used to secure cable 100, preventing cable 100 from moving when ferrule 416 is being crimped.

In step 906 ferrule 416 is crimped using a crimping machine located above the base 802. When ferrule 416 is crimped, inner flat braid 106, center foil 108, outer braid 110 and outer jacket 104 are all compressed pushing connector 200 outward. If outer surface 808 of cable stop 804 is vertical, connector 200 will be pushed up against outer surface 808 miss-aligning connector 200 and possibly damaging the connector 200 or cable 100.

In one embodiment of the invention, outer surface 808 can be slanted downward and away from connector 200 as illustrated in FIG. 8A. In one embodiment of the invention, outer surface 808 can be slanted 3-5 degrees from vertical (the dotted line depicted in FIG. 8A is vertical). By slanting outer surface 808 downward and away from the connector 200, when the ferrule 416 is crimped, the cable 100 will be pushed downward and the connector 200 will be pushed toward outer surface 808. Since the outer surface 808 is slanted downward and away from the connector, when the connector is forced toward the outer surface 808 there will be a space provided for this expansion without damaging the connector 200 or cable 100.

Thus, the present invention provides a way to connect a connector and crimp a ferrule onto a cable quickly and efficiently reducing assembly time from approximately 2 minutes for each cable end to approximately 15 second per cable end. The present invention also provides consistent test results at frequencies above 7.0 GHz, resulting in repetitive-quality cables. The present invention also allows an operator to achieve proper contact depth without gauging and allows an operator to position shielding over the connector body without disturbing the shielding of the cable. This is important to maintain mechanical and electrical integrity. The present invention, thus, ensures that the interface between the cable and connector is as specified by the connector's manufacturing instructions and also ensures that the assembly of the connector is tight and prevents the connector from spinning or twisting on the cable (loose connectors cause cable failures, especially at high frequencies). The present invention also ensures proper connector orientation relative to the cable and prevents the connector or cable from being damaged when the ferrule is crimped.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A connection device for attaching a connector onto a cable, comprising:

a securing device, including:

a stop including a passage that receives a cable having an outer jacket, at least one inner layer and a core, and a handle, connected to the stop, having an engaged position that secures the cable within the passage; and a connector installer, including:

an engagement device that engages a connector, and a handle, connected to the engagement device, having an engaged position that force fits the connector onto the cable by pushing a ferrule simultaneously against the stop and the connector when the cable is secured by the securing device, wherein the securing device and the connector installer are mounted on a base in an orthogonal relationship to each other.

2. The connection device as recited in claim 1, wherein the connector installer includes an indicator to indicate cable length and to properly seat the core onto the connector.

3. The connection device as recited in claim 1, wherein said securing device handle is lockable in the engaged position.

4. The connection device as recited in claim 1, wherein said connector installer handle is lockable in the engaged position.

5. The connection device as recited in claim 1, wherein said layer is a metal braiding.

6. The connection device as recited in claim 1, wherein said layer is a wrap mylar film.

7. The connection device as recited in claim 2, wherein the indicator includes markings.

8. The connection device as recited in claim 7, wherein the indicator includes retractable extensions.

* * * * *